(12) United States Patent
Shah

(10) Patent No.: US 10,949,868 B1
(45) Date of Patent: Mar. 16, 2021

(54) METHOD AND SYSTEM FOR SINGLE USE OF ELECTRONIC RETAILER COUPONS AND REFERRAL PROGRAM

(71) Applicant: Mobivity, Inc., Chandler, AZ (US)

(72) Inventor: Alex Shah, San Diego, CA (US)

(73) Assignee: Mobivity, Inc., Chandler, AZ (US)

( * ) Notice: Subject to any disclaimer, the term of this patent is extended or adjusted under 35 U.S.C. 154(b) by 556 days.

(21) Appl. No.: 15/075,176

(22) Filed: Mar. 20, 2016

Related U.S. Application Data

(60) Provisional application No. 62/137,223, filed on Mar. 24, 2015, provisional application No. 62/255,427, filed on Nov. 14, 2015.

(51) Int. Cl.
| | | |
|---|---|---|
| *G06Q 30/02* | (2012.01) | |
| *H04L 29/08* | (2006.01) | |
| *H04W 4/14* | (2009.01) | |
| *H04W 4/02* | (2018.01) | |
| *H04W 12/12* | (2021.01) | |
| *H04W 88/02* | (2009.01) | |

(52) U.S. Cl.
CPC ..... *G06Q 30/0214* (2013.01); *G06Q 30/0224* (2013.01); *G06Q 30/0225* (2013.01); *H04L 67/02* (2013.01); *H04W 4/02* (2013.01); *H04W 4/14* (2013.01); *H04W 12/12* (2013.01); *H04L 2463/082* (2013.01); *H04W 88/02* (2013.01)

(58) Field of Classification Search
CPC .............. G06Q 30/02; G06Q 30/0214; G06Q 30/0224; G06Q 30/0225; H04L 67/02
See application file for complete search history.

(56) References Cited

U.S. PATENT DOCUMENTS

| | | | | |
|---|---|---|---|---|
| 2004/0103023 | A1* | 5/2004 | Irwin | G06Q 30/0225 705/14.26 |
| 2008/0319843 | A1* | 12/2008 | Moser | G06Q 30/06 705/14.24 |
| 2012/0173322 | A1* | 7/2012 | Ringewald | G06Q 20/16 705/14.16 |
| 2015/0019307 | A1* | 1/2015 | Girard | G06Q 30/0267 705/14.12 |
| 2015/0051960 | A1* | 2/2015 | Barbaria | G06Q 30/0215 705/14.17 |
| 2015/0112870 | A1* | 4/2015 | Nagasundaram | G06Q 20/401 705/67 |
| 2017/0148060 | A1* | 5/2017 | Showers | H04W 4/02 |

OTHER PUBLICATIONS

Kuganathan et al., "Next generation smart transaction touch points" (published in 2014 14th International Conference on Advances in ICT for Emerging Regions (ICTer), pp. 96-102, Dec. 1, 2014) (Year: 2014).*

* cited by examiner

*Primary Examiner* — James M Detweiler
*Assistant Examiner* — Patrick Kim
(74) *Attorney, Agent, or Firm* — Clause Eight IPS; Michael Catania

(57) ABSTRACT

A method and system for one time use of electronic retailer coupons is disclosed herein. The method and system prevents fraud, is specific to a geolocation and provides an audit trail of the customer, cashier and marketing platform. A user can also earn a subsequent coupon by referring a friend.

17 Claims, 21 Drawing Sheets

36 ->   valid only at
Chandler, AZ location

METHOD AND SYSTEM FOR SINGLE USE OF ELECTRONIC RETAILER COUPONS AND REFERRAL PROGRAM

CROSS REFERENCES TO RELATED APPLICATIONS

The present application claims priority to U.S. Provisional Patent Application No. 62/137,223 filed on Mar. 24, 2015, and U.S. Provisional Patent Application No. 62/255,427 filed on Nov. 14, 2015, both of which are hereby incorporated by reference in their entireties.

STATEMENT REGARDING FEDERALLY SPONSORED RESEARCH OR DEVELOPMENT

Not Applicable

BACKGROUND OF THE INVENTION

Field of the Invention

The present invention generally relates to mobile communications.

Description of the Related Art

The prior art discusses various electronic marketing mechanisms.

General definitions for terms utilized in the pertinent art are set forth below.

APP is a software application for a mobile phone such as a smart phone.

Application Programming Interface (API) is a collection of computer software code, usually a set of class definitions, that can perform a set of related complex tasks, but has a limited set of controls that may be manipulated by other software-code entities. The set of controls is deliberately limited for the sake of clarity and ease of use, so that programmers do not have to work with the detail contained within the given API itself.

Beacon is a management frame that contains all of the information about a network. In a WLAN, Beacon frames are periodically transmitted to announce the presence of the network.

BLUETOOTH technology is a standard short range radio link that operates in the unlicensed 2.4 gigaHertz band.

BLUETOOTH LOW ENERGY (aka "BLE" or "BLU-ETOOTH LE") is a communication format from the Bluetooth Special Interest Group which uses the 2.4 gigaHertz band of BLUETOOTH technology but with a simpler modulation system that supports data pockets ranging from 8 to 27 octets, which are transferred at 1 Mbps.

Code Division Multiple Access ("CDMA") is a spread spectrum communication system used in second generation and third generation cellular networks, and is described in U.S. Pat. No. 4,901,307.

CRM (Customer Relationship Management) is a widely-implemented strategy for managing a company's interactions with customers, clients and sales prospects. CRM involves using technology to organize, automate, and synchronize business processes and the like—principally sales activities, but also business processes and the like for marketing, customer service and technical support.

DHCP (Dynamic Host Configuration Protocol) is a standard network protocol defined by RFC 1541 that allows a server to dynamically distribute IP addressing and configuration information, such as the subnet mask and the default gateway, to clients upon client requests.

Direct Inward Dialing ("DID") involves a carrier providing one or more trunk lines to a customer for connection to the customer's private branch exchange ("PBX") and a range of telephone lines are allocated to this line.

FTP or File Transfer Protocol is a protocol for moving files over the Internet from one computer to another.

GSM, Global System for Mobile Communications is a second generation digital cellular network.

Hypertext Transfer Protocol ("HTTP") is a set of conventions for controlling the transfer of information via the Internet from a web server computer to a client computer, and also from a client computer to a web server, and Hypertext Transfer Protocol Secure ("HTTPS") is a communications protocol for secure communication via a network from a web server computer to a client computer, and also from a client computer to a web server by at a minimum verifying the authenticity of a web site.

Internet is the worldwide, decentralized totality of server computers and data-transmission paths which can supply information to a connected and browser-equipped client computer, and can receive and forward information entered from the client computer.

Media Access Control (MAC) Address is a unique identifier assigned to the network interface by the manufacturer.

Organizationally Unique Identifier (OUI) is a 24-bit number that uniquely identifies a vendor, manufacturer, or organization on a worldwide basis. The OUI is used to help distinguish both physical devices and software, such as a network protocol, that belong to one entity from those that belong to another.

Probe Request: A frame that contains the advertisement IE for a device that is seeking to establish a connection with a proximate device.

Probe Response: A frame that contains the advertisement IE for a device. The Probe Response is sent in response to a Probe Request.

SSID (Service Set Identifier) is a 1 to 32 byte string that uniquely names a wireless local area network.

Transfer Control Protocol/Internet Protocol ("TCP/IP") is a protocol for moving files over the Internet.

URL or Uniform Resource Locator is an address on the World Wide Web.

User Interface or UI is the junction between a user and a computer program. An interface is a set of commands or menus through which a user communicates with a program. A command driven interface is one in which the user enter commands. A menu-driven interface is one in which the user selects command choices from various menus displayed on the screen.

Wayfinding is defined as tracking an object within a pre-determined space.

Web-Browser is a complex software program, resident in a client computer, that is capable of loading and displaying text and images and exhibiting behaviors as encoded in HTML (HyperText Markup Language) from the Internet, and also from the client computer's memory. Major browsers include MICROSOFT INTERNET EXPLORER, NETSCAPE, APPLE SAFARI, MOZILLA FIREFOX, and OPERA.

Web-Server is a computer able to simultaneously manage many Internet information-exchange processes at the same time. Normally, server computers are more powerful than client computers, and are administratively and/or geographically centralized. An interactive-form information-collection process generally is controlled from a server computer, to which the sponsor of the process has access.

Wireless Application Protocol ("WAP") is an open, global specification that empowers users with mobile wireless communication devices (such as mobile phones) to easily access data and to interact with Websites over the Internet through such mobile wireless communication device. WAP works with most wireless communication networks such as CDPD, CDMA, GSM, PDC, PHS, TDMA, FLEX, reflex, iDEN, TETRA, DECT, DataTAC, Mobitex and GRPS. WAP can be built on most operating systems including PalmOS, WINDOWS, CE, FLEXOS, OS/9, JavaOS and others.

WAP Push is defined as an encoded WAP content message delivered (pushed) to a mobile communication device which includes a link to a WAP address.

Wireless AP (access point) is a node on the wireless local area network (WLAN) that allows wireless devices to connect to a wired network using Wi-Fi, or related standards.

Fraud is prevalent with the use of electronic coupons.

There is a need for a better system.

BRIEF SUMMARY OF THE INVENTION

The present invention is a method and system for one time use of electronic retailer coupons that prevents fraud, is specific to a geolocation and provides an audit trail of the customer, cashier and marketing platform. A user can also earn a subsequent coupon by referring a friend.

One aspect of the present invention is a method for single use of electronic retailer coupons and referral program. The method includes transmitting a communication with coupon offer from a marketing server to a mobile device of a customer. The method also includes receiving a confirmation text for acceptance of the coupon offer at the marketing server from the mobile device. The method also includes verifying at the marketing server that the coupon offer is still available for this customer. The method also includes transmitting a communication with a coupon link from the marketing server to the mobile device. The method also includes receiving a request for the coupon offer from the coupon link, the request having a HTTP header. The method also includes transmitting the coupon communication to the mobile device. The method also includes obtaining geolocation data for the mobile device at the marketing server. The method also includes verifying that the geolocation of the mobile device matches the geolocation of the retail location for the coupon. The method also includes receiving redemption verification of the use of the coupon. The method also includes storing the redemption verification in a database. The method also includes downloading a referral feature on a mobile application of the mobile device. The method also includes transmitting a unique link via text with a mobile device of a referral. The method also includes clicking on the unique link. The method also includes entering a mobile number of the mobile device of the referral. The method also includes receiving a text to confirm joining a rewards program. The method also includes receiving an opt-in offer via text. The method also includes receiving a text at the mobile device of the user. The method also includes checking a status of referrals. The method also includes earning an achievement upon meeting a threshold of referrals. The method also includes receiving a subsequent coupon for use.

Another aspect of the present invention is a system for single use of electronic retailer coupons and referral program. The system includes a marketer server, at least one retail location, at least one mobile device of a customer, a plurality of referral mobile devices, and a network. The marketing server is configured to transmit a communication with coupon offer from the marketing server to the mobile device of the customer. The marketing server is configured to receive a confirmation text for acceptance of the coupon offer at the marketing server from the mobile device. The marketing server is configured to verify at the marketing server that the coupon offer is still available for this customer. The marketing server is configured to transmit a communication with a coupon link from the marketing server to the mobile device. The marketing server is configured to receive a request for the coupon offer from the coupon link, the request having a HTTP header. The marketing server is configured to transmit the coupon communication to the mobile device. The marketing server is configured to obtain geolocation data for the mobile device at the marketing server. The marketing server is configured to verify that the geolocation of the mobile device matches the geolocation of the retail location for the coupon. The marketing server is configured to receive redemption verification of the use of the coupon. The marketing server is configured to store the redemption verification in a database. The marketing server is configured to transmit a referral feature to the mobile device. The marketing server is configured to transmit a unique link to each of the plurality of referral mobile devices. The marketing server is configured to transmit a confirmation text to each of the plurality of referral mobile devices. The marketing server is configured to transmit an op-tin offer via text to each of the plurality of referral mobile devices. The marketing server is configured to track a number of referrals for the user. The marketing server is configured to transmit to the mobile device of the user a subsequent coupon when an achievement is earned.

Yet another aspect of the present invention is a method for one time use of electronic retailer coupons. The method includes transmitting a communication with coupon offer from a marketing server to a mobile device of a customer. The method also includes receiving a confirmation text for acceptance of the coupon offer at the marketing server from the mobile device. The method also includes verifying at the marketing server that the coupon offer is still available for this customer. The method also includes transmitting a communication with a coupon link from the marketing server to the mobile device. The method also includes receiving a request for the coupon offer from the coupon link, the request having a HTTP header. The method also includes transmitting the coupon communication to the mobile device. The method also includes obtaining geolocation data for the mobile device at the marketing server. The method also includes verifying that the geolocation of the mobile device matches the geolocation of the retail location for the coupon. The method also includes receiving redemption verification of the use of the coupon. The method also includes storing the redemption verification in a database.

Yet another aspect of the present invention is a system for one time use of electronic retailer coupons. The system includes a marketer server, at least one retail location, at least one mobile device of a customer, and a network. The marketing server is configured to transmit a communication with coupon offer from the marketing server to the mobile device of the customer. The marketing server is configured to receive a confirmation text for acceptance of the coupon offer at the marketing server from the mobile device. The marketing server is configured to verify at the marketing server that the coupon offer is still available for this customer. The marketing server is configured to transmit a communication with a coupon link from the marketing server to the mobile device. The marketing server is configured to receive a request for the coupon offer from the coupon link, the request having a HTTP header. The marketing server is configured to transmit the coupon communication to the mobile device. The marketing server is configured to obtain geolocation data for the mobile device at the marketing server. The marketing server is configured to verify that the geolocation of the mobile device matches the geolocation of the retail location for the coupon. The marketing server is configured to receive redemption verification of the use of the coupon. The marketing server is configured to store the redemption verification in a database.

Yet another aspect of the present invention is a method for single use of electronic retailer coupons and referral program. The method includes downloading a referral feature on a mobile application of the mobile device. The method also includes transmitting a unique link via text with a mobile device of a referral. The method also includes clicking on the unique link. The method also includes entering a mobile number of the mobile device of the referral. The method also includes receiving a text to confirm joining a rewards program. The method also includes receiving an opt-in offer via text. The method also includes receiving a text at the mobile device of the user. The method also includes checking a status of referrals. The method also includes earning an achievement upon meeting a threshold of referrals. The method also includes receiving a subsequent coupon for use.

Yet another aspect of the present invention is a system for one time use of electronic retailer coupons. The system includes a marketer server, at least one retail location, at least one mobile device of a customer, a plurality of referral mobile devices; and a network. The marketing server is configured to transmit a referral feature to the mobile device. The marketing server is configured to transmit a unique link to each of the plurality of referral mobile devices. The marketing server is configured to transmit a confirmation text to each of the plurality of referral mobile devices. The marketing server is configured to transmit an op-tin offer via text to each of the plurality of referral mobile devices. The marketing server is configured to track a number of referrals for the user. The marketing server is configured to transmit to the mobile device of the user a subsequent coupon when an achievement is earned.

The communication is preferably one of a SMS, an email, a social network message, a mobile push, a television ad, or a radio ad. The method further comprises requesting the customer opt-in to a loyalty program. The coupon is preferably sent in a format supported by the mobile device. The redemption preferably only works if the customer is at the geolocation for the retailer. The method further comprises verifying the coupon with a multi-factor authentication token at the retailer. The invention further comprises a multi-factor authentication engine that prevents fraud. The coupon is preferably for ice cream. The method further comprises targeting future offers to the customer based on the coupon redemption history.

Having briefly described the present invention, the above and further objects, features and advantages thereof will be recognized by those skilled in the pertinent art from the following detailed description of the invention when taken in conjunction with the accompanying drawings.

BRIEF DESCRIPTION OF THE SEVERAL VIEWS OF THE DRAWINGS

FIG. 3 is an illustration of a communication from a marketing server.

DETAILED DESCRIPTION OF THE INVENTION

Figure 1:
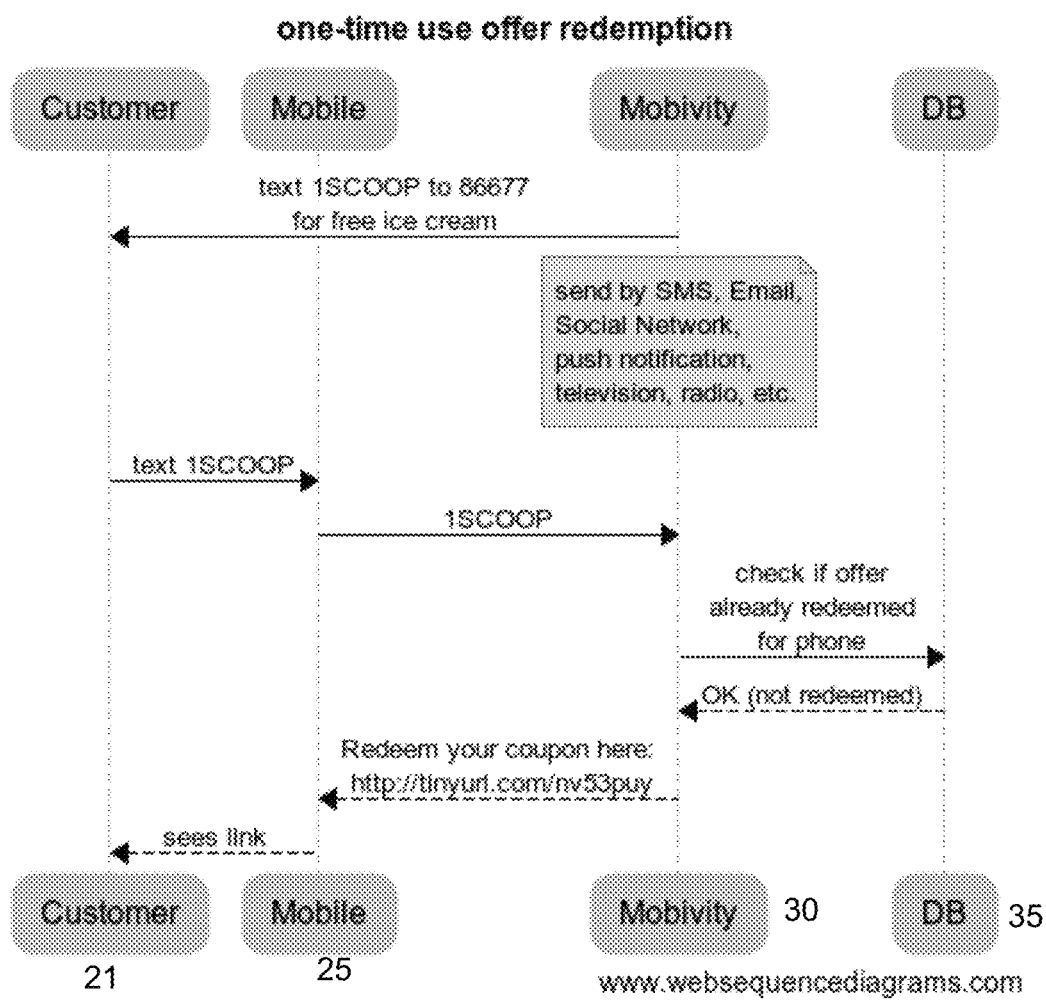
FIG. 1 is a communications sequence diagram for a one time use of electronic retailer coupons.

One-time use SMS coupons is an innovative way to delivery an offer or promotion to a customer that can only be used once, must be used at specific geographic location (geo-fenced), deters fraud, and provides an audit trail of the conversation between the customer, cashier and the Mobivity marketing platform, without the need for tight coupling with the POS vendor.

In addition to a broadcasted offer, a customer can also receive a targeted mobile offer based on past purchase history, interactions with the merchant, the store location, weather or event information specific to their region, or loyalty points they have earned ($5 off after spending $50, for example).

The offer can be sent by any communication channel including SMS, Email, Social Network, mobile push notification, television ad, or radio ad. The sequence diagram above demonstrates the flow for a free ice cream cone offer. The call to action is to send an SMS message to a short code.

Alternatively, if the Customer's phone number is already known, and the phone has already opt-ed to receive text messages from Mobivity, then the offer link can be sent directly to the Customer without first receiving an offer keyword.

Furthermore, if the Customer has not opt-ed to receive text messages from Mobivity, the user may be asked to join the loyalty text club, e.g.: "Reply Y to join the ice cream loyalty club and receive text alerts. Periodic msgs/month. Text HELP for help. Msg&Data rates may apply."

After the Customer sends 1SCOOP to 86677 they receive a link to the offer that can be displayed on a variety of mobile devices. We look at the HTTP headers (userAgent) to determine what type of mobile device is requesting the information: smart phone, flip phone, etc. and publish the offer content in a form that can be supported for that device. Content can be delivered to devices that support HTML5, HTML and XHTML MP. If HTTP is not available, a WAP Push message can be sent to deliver the offer content.

After Customer clicks on offer link from their mobile phone, a web page is sent down to the mobile device with the following components.

Ask customer to redeem offer when they arrive at store (valid only at location should appear on screen, not shown).

Ask for geolocation. Redeem button only works if customer is at correct store location.

After redeeming, logo spins, and offer is only valid for 1 minute.

Note: geolocation is only available on devices that support HTML5. For other mobile devices, the geolocation enforcement will have to be done by the cashier.

In addition to the offer description, the mobile content page may have the following components: 1—Brand logo and/or offer image; 2—Offer limitations; 3—Expiration time; 4—Multi-Factor Authentication string; 5—Store Location; 6—Redeem button (shown in Baskin example); 7—Animation (shown in Baskin example).

In the case where the MFA is used, the cashier will verify that the MFA token shown matches the MFA token displayed at their location. This token can be delivered via a time-sensitive keychain device at the store location. These keychain devices are relatively inexpensive ($15), are easily shipped and installed at the store location and have a 5 year battery life.

Some limitations of the above described fraud prevention method are that it requires the cashier to make several judgments: 1—verify the location offer when the mobile phone's geolocation is not available; 2—check for logo animation; 3—check that offer hasn't expired; 4—if the MFA token is used, match the displayed token on the Customer's mobile phone with the one at the counter.

Mobivity has mechanisms to limit fraud or operational issues by employees as well. These include employees giving a discount: 1—to friends that did not earn them; 2—when a offer was not presented; 3—when the offer was for a different store; 4—when the redemption button was not clicked (see Baskin screenshots); 5—when the offer has expired; 6—for a different offer than the one sent by Mobivity; 7—when the MFA token did not match.

Linking offer redemption to receipt discount to limit fraud and operational issues by employees After Cashier validates offer, clicks on POS discount button, closes transaction, and prints out the receipt, Mobivity's Receipt Interceptor Computer (MC, part of Smart-Receipt product), then uploads the receipt to our cloud infrastructure. Uploading of a receipt with a Mobivity discount string triggers the Mobivity platform to find the corresponding redemption in our DB, by searching for transactions at that store location, for that offer, during that time window. The phone number associated with that redemption is then associated with the receipt, which provides us a purchase history for customers that have redeemed Mobivity coupons.

Linking a customer's phone number to purchase history and offer redemptions, allows us to more effectively target offers for that customer in the future, through data analysis and statistical models.

By linking every redeemed offer to a receipt, we can also limit fraud or operational issues by notifying store managers when unusual activity occurs, such as when a discount is given without a corresponding offer redemption in our database, or when a redemption is received by a mobile phone, but the corresponding discount is not found on the receipt.

Attempts to re-use one-time use offers.

When a customer tries to request an offer after it has been redeemed or has expired they will receive the message: "You have already received your coupon", or "Offer has expired". If the customer tries to click on the web link after redeeming the offer, or after the offer has expired, they will see a web based error message, similar screenshot.

In another embodiment, the user earns another coupon by sharing the offer with friends.

Figure 2:
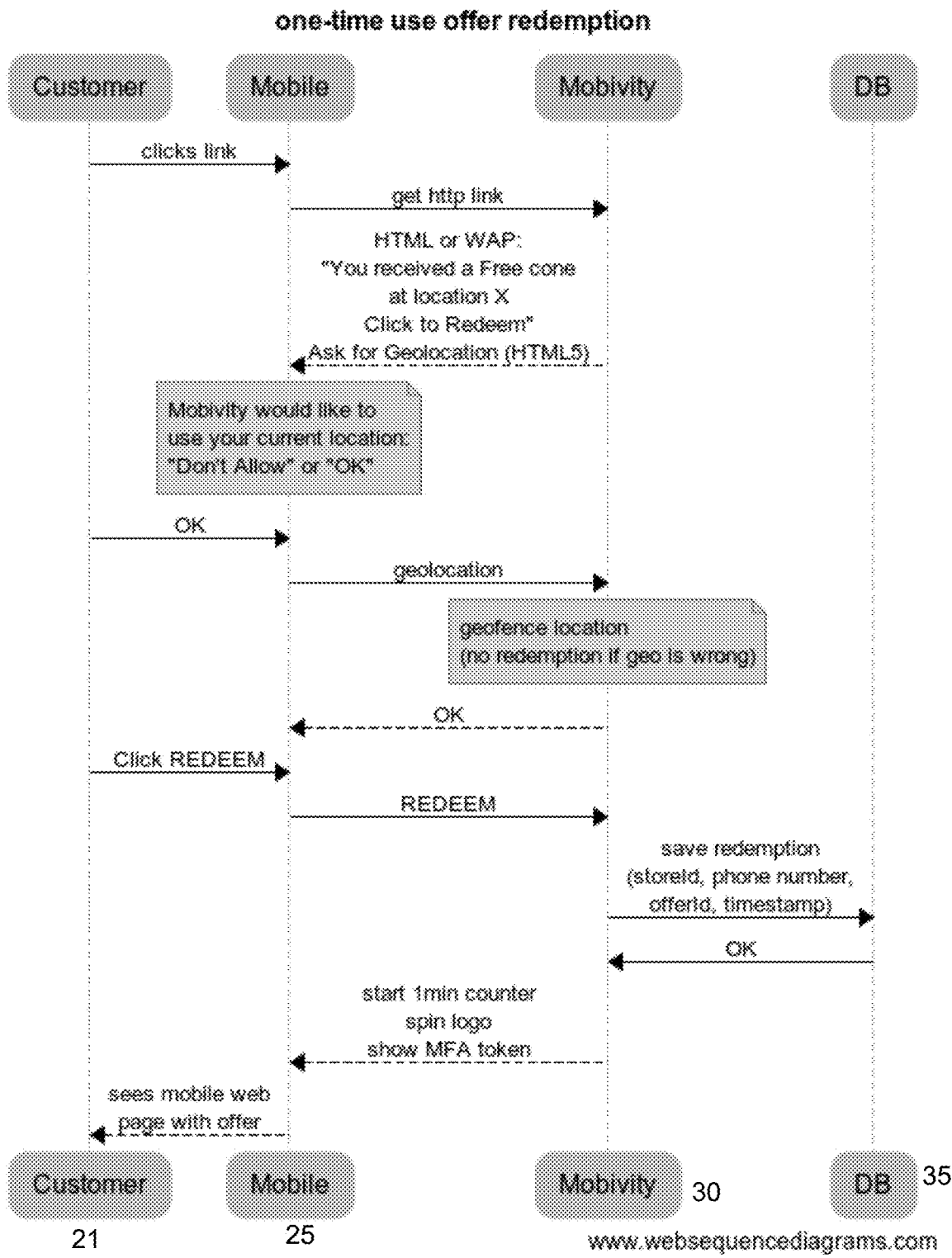
FIG. 2 is a communications sequence diagram for a one time use of electronic retailer coupons.

FIG. 1 is a communications sequence diagram for a process 100 for a one time use of electronic retailer coupons. FIG. 2 is a communications sequence diagram for a process 100 for a one time use of electronic retailer coupons. The process includes a customer 21 with a mobile phone 25 interacting with a server 30 and the server 30 interacting with a database 35.

Figure 3:
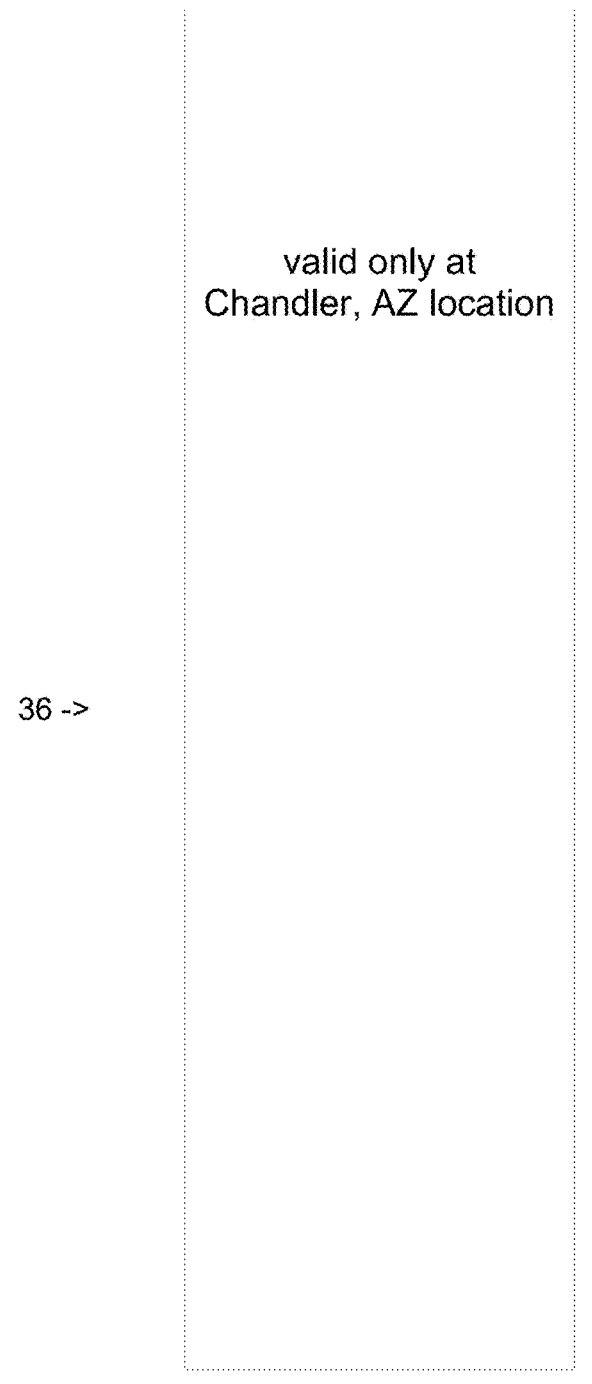
Figure 4:
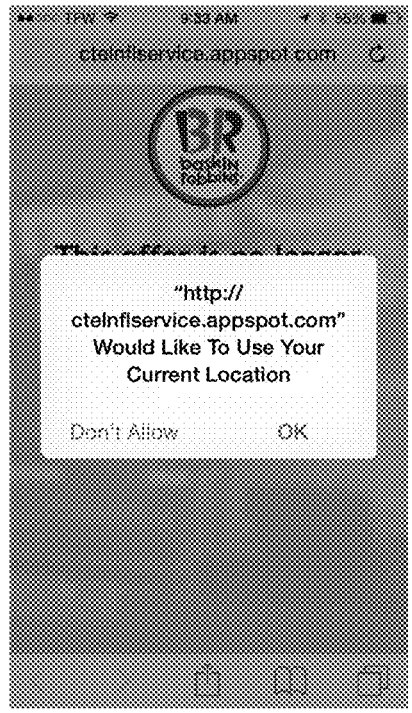
FIG. 4 is an illustration of a communication from a marketing server.
Figure 5:
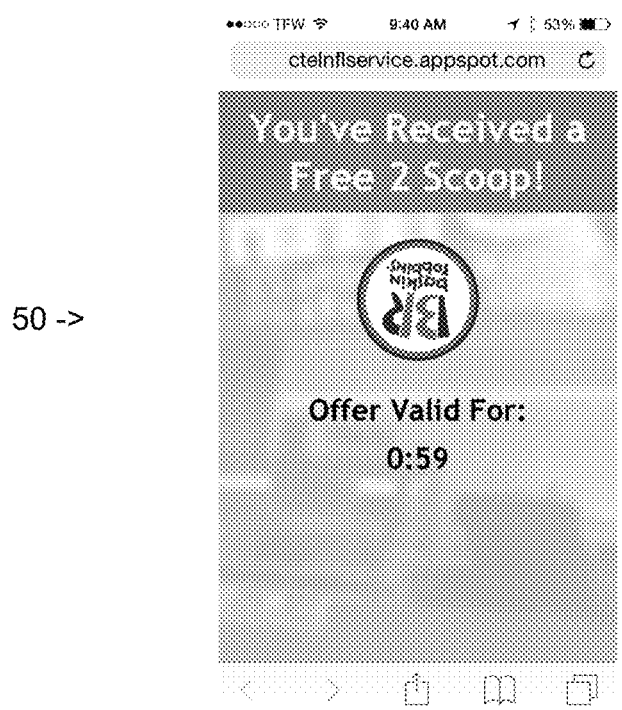
FIG. 5 is an illustration of a communication from a marketing server.
Figure 6:
FIG. 6 is an illustration of a mobile phone with a communication marketing offer.

FIG. 3 is an illustration of a communication 36 from a marketing server. FIG. 4 is an illustration of a communication 40 from a marketing server. FIG. 5 is an illustration of a communication 50 from a marketing server. FIG. 6 is an illustration of a mobile phone with a communication marketing offer 60.

Figure 7:
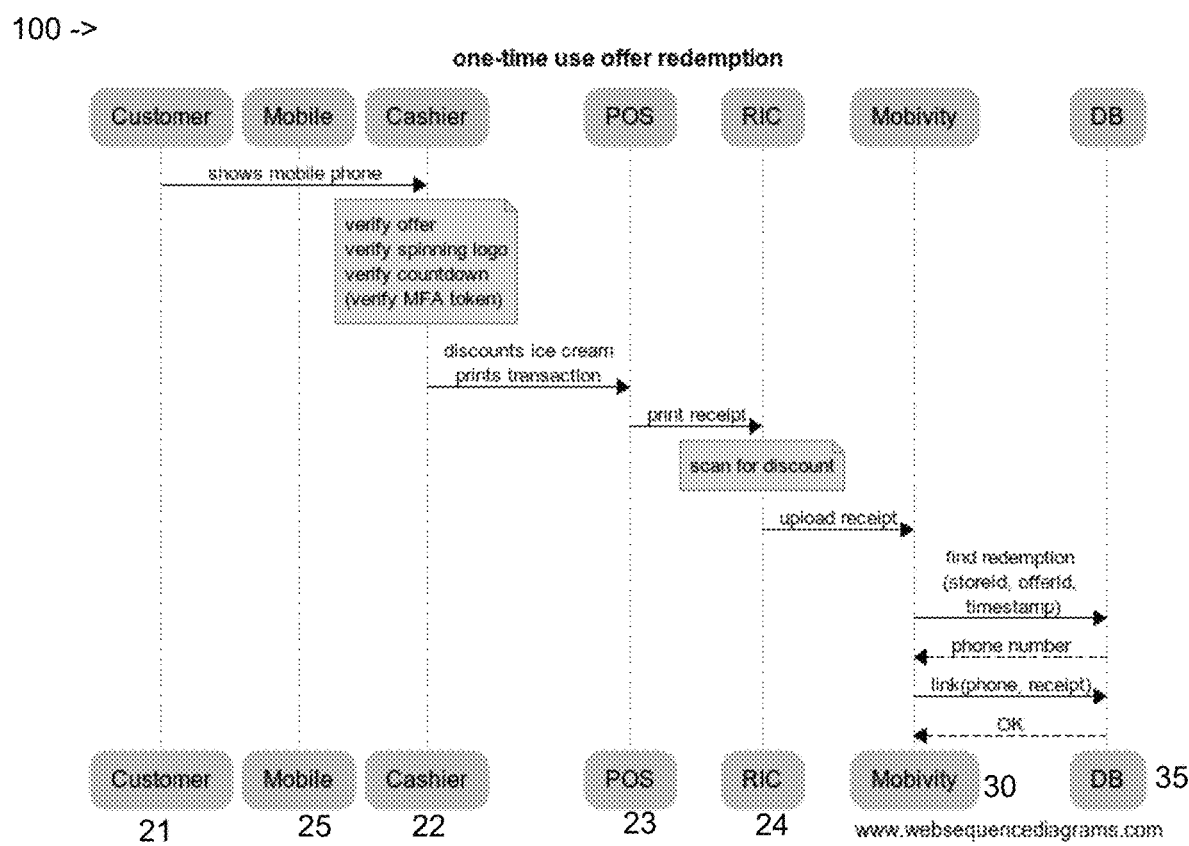
FIG. 7 is a communications sequence diagram for a one time use of electronic retailer coupons.

FIG. 7 is a communications sequence diagram of a process 100 for a one time use of electronic retailer coupons. The customer 21 shows a mobile phone 25 to a cashier 22. The cashier discounts the ice cream at the point of sale (POS) 23 which print receipts for the RIC 24, which uploads the receipt to the server 30 which accesses database 35.

Figure 8:
FIG. 8 is an illustration of a communication informing the user that the offer has been exhausted.
Figure 9:
FIG. 9 is an illustration of a communication informing the user that the use can earn more offers.
Figure 10:
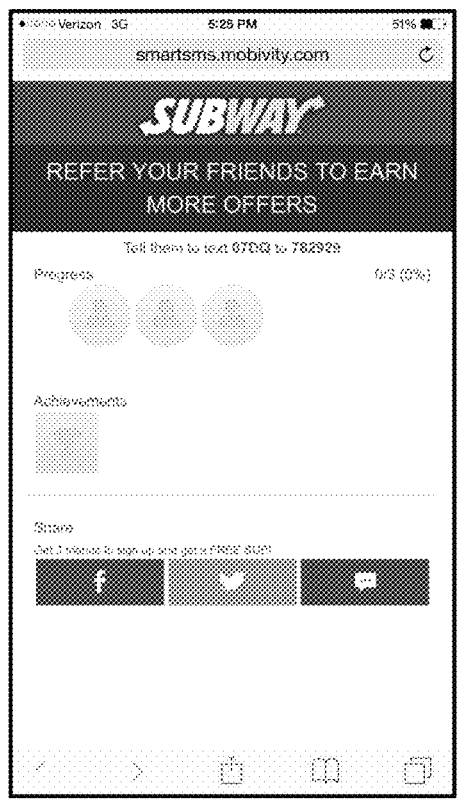
FIG. 10 is an illustration of a communication informing the user that users can refer friends to join the text club by either telling them to text in their unique keyword or by sharing a unique link via text, Twitter and/or Facebook.
Figure 11:
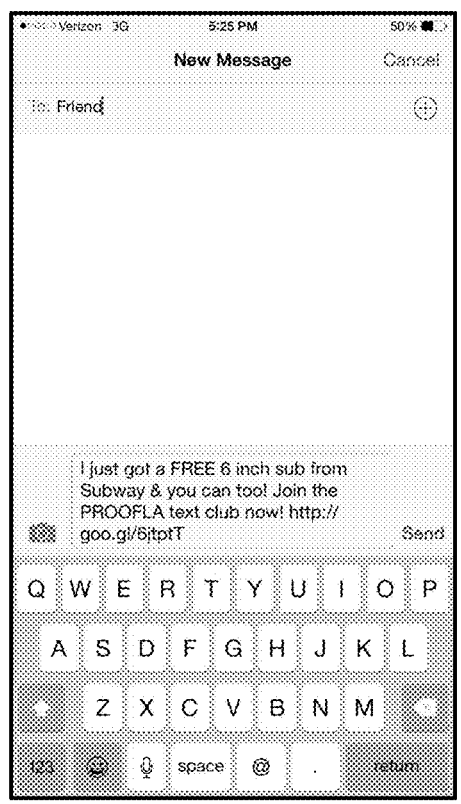
FIG. 11 is an illustration of a communication showing that share messages are pre-populated with a message and a unique URL.
Figure 12:
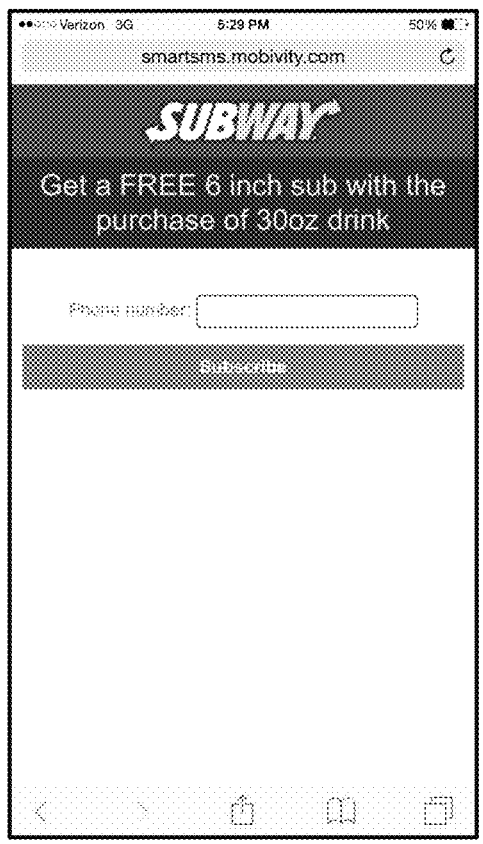
FIG. 12 is an illustration of a communication informing the user that by clicking on the unique link, friends can enter their mobile number to join the text club.
Figure 13:
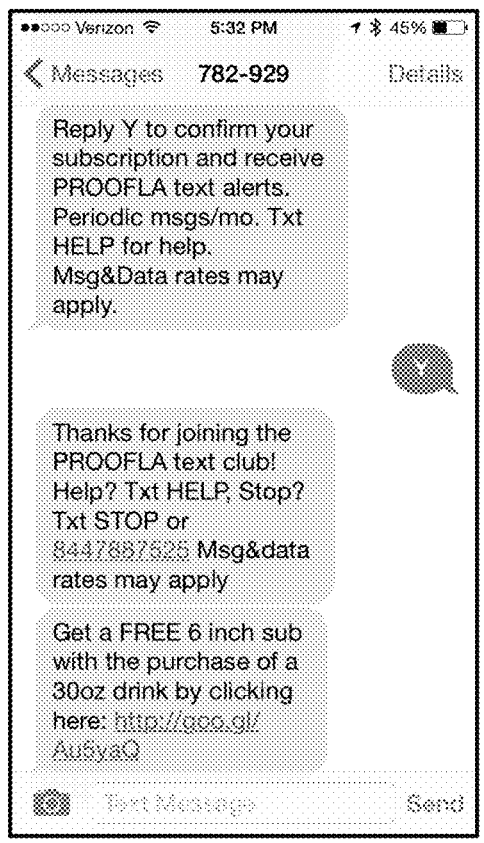
FIG. 13 is an illustration of a communication informing the user that friends will receive a text asking for a confirmation response to join the text club.
Figure 14:
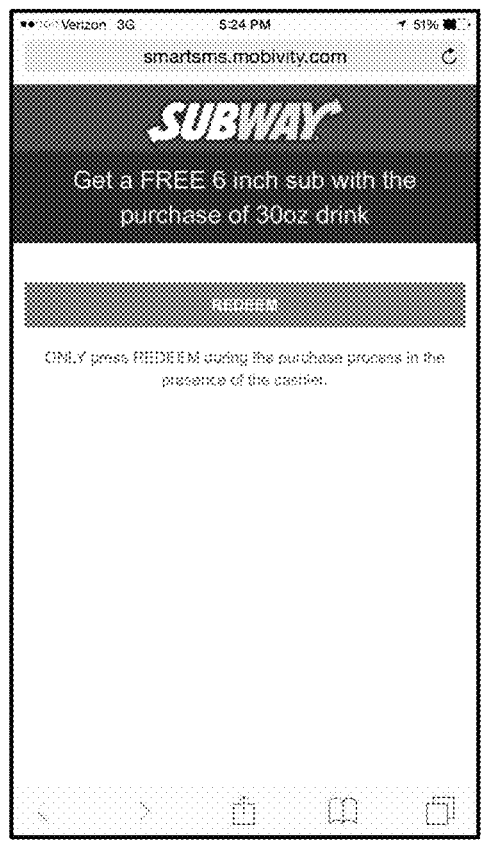
FIG. 14 is an illustration of a communication informing the user that upon subscription, friends will receive the opt-in offer via text.
Figure 15:
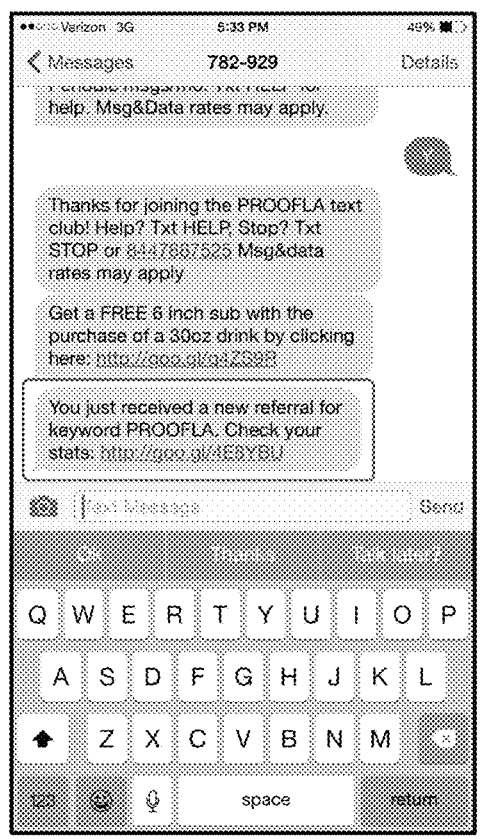
FIG. 15 is an illustration of a communication informing the user that users will receive a text each time a new friend joins the text club with a unique link to a stats page.
Figure 16:
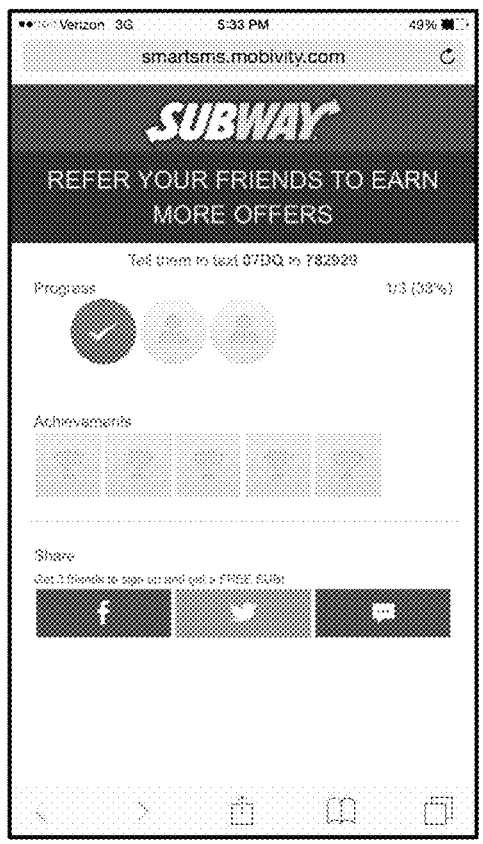
FIG. 16 is an illustration of a communication informing the user that by clicking on the unique link, users can check their current stats and share with more friends.
Figure 17:
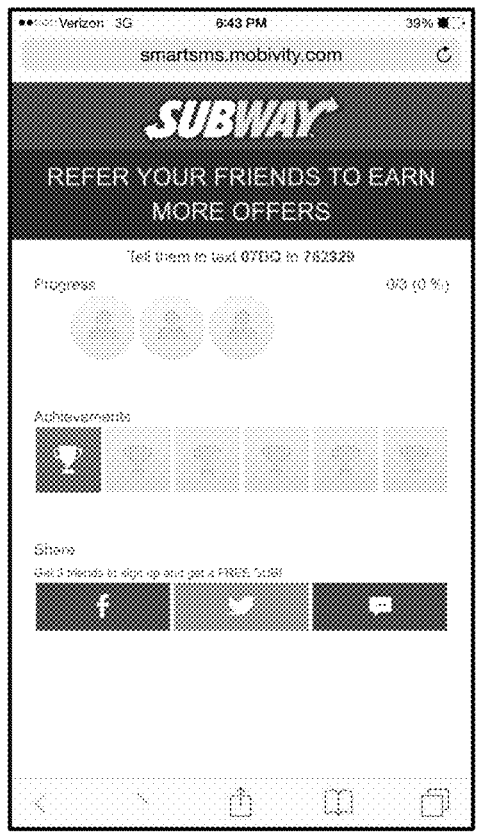
FIG. 17 is an illustration of a communication informing the user that once a user refers enough friends, the stats page will update and show an Achievement has been earned.
Figure 18:
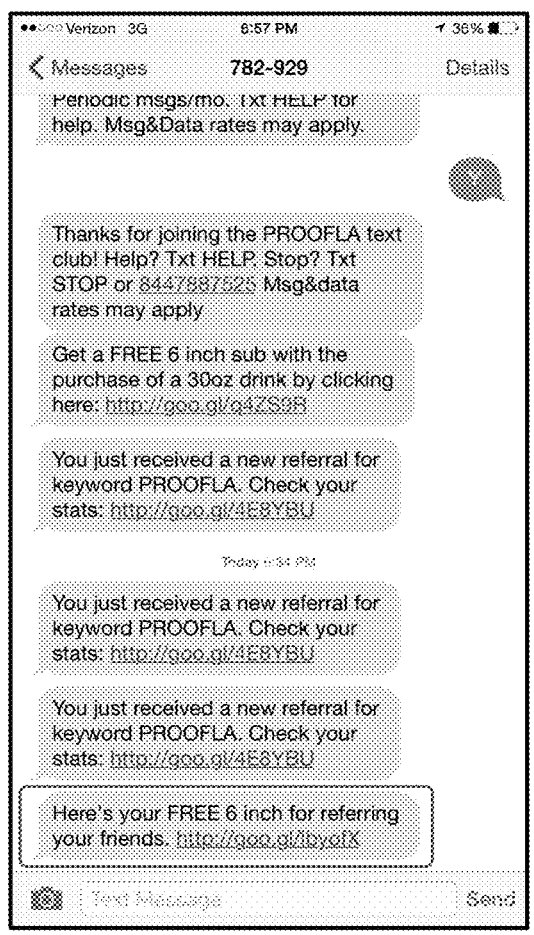
FIG. 18 is an illustration of a communication informing the user that they have earned a new coupon.
Figure 19:
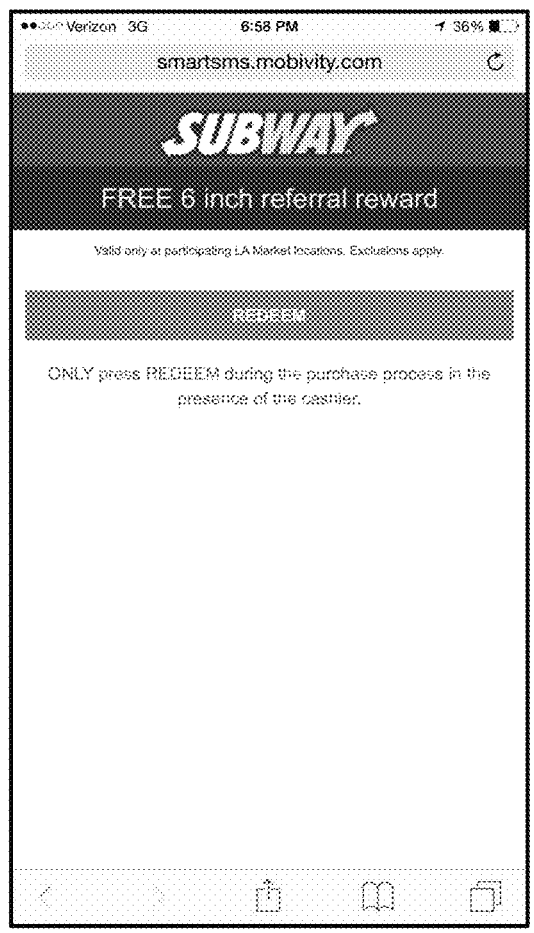
FIG. 19 is an illustration of a new coupon.

FIG. 8 is an illustration of a communication 80 informing the user that the offer has been exhausted. FIG. 9 is an illustration of a communication 90 informing the user that the use can earn more offers. FIG. 10 is an illustration of a communication 101 informing the user that users can refer friends to join the text club by either telling them to text in their unique keyword or by sharing a unique link via text, Twitter and/or Facebook. FIG. 11 is an illustration of a communication 110 showing that share messages are pre-populated with a message and a unique URL. FIG. 12 is an illustration of a communication 120 informing the user that by clicking on the unique link, friends can enter their mobile number to join the text club. FIG. 13 is an illustration of a communication 130 informing the user that friends will receive a text asking for a confirmation response to join the text club. FIG. 14 is an illustration of a communication 140 informing the user that upon subscription, friends will receive the opt-in offer via text. FIG. 15 is an illustration of a communication 150 informing the user that users will receive a text each time a new friend joins the text club with a unique link to a stats page. FIG. 16 is an illustration of a communication 160 informing the user that by clicking on the unique link, users can check their current stats and share with more friends. FIG. 17 is an illustration of a communication 170 informing the user that once a user refers enough friends, the stats page will update and show an Achievement has been earned. FIG. 18 is an illustration of a communication 180 informing the user that they have earned a new coupon. FIG. 19 is an illustration of a new coupon 190.

As shown in FIGS. 9-19, once the Refer A Friend feature is enabled, an EARN MORE OFFERS button appears on the coupon redeem page.

Users can refer friends to join the text club by either telling them to text in their unique keyword or by sharing a unique link via text, Twitter and/or Facebook.

Share messages are pre-populated with a message and a unique URL.

By clicking on the unique link, friends can enter their mobile number to join the text club.

Friends will receive a text asking for a confirmation response to join the text club.

Upon subscription, friends will receive the opt-in offer via text.

Users will receive a text each time a new friend joins the text club with a unique link to a stats page.

By clicking on the unique link, users can check their current stats and share with more friends.

Once a user refers enough friends, the stats page will update and show an achievement has been earned.

Users receive a new SmartSMS coupon when they earn a referral award.

The mobile communication devices 25 utilized with the present invention preferably include mobile phones, smartphones, tablet computers, PDAs and the like. Examples of smartphones include the IPHONE® smartphone from Apple, Inc., BLACKBERRY® smartphones from Research In Motion, the DROID® smartphone from Motorola Mobility Inc., GALAXY S® smartphones from Samsung Electronics Co., Ltd, and many more. Examples of tablet computing devices include the IPAD® tablet from Apple Inc., and the GALAXY TAB® tablet from Samsung Electronics Co., Ltd.

Figure 20:
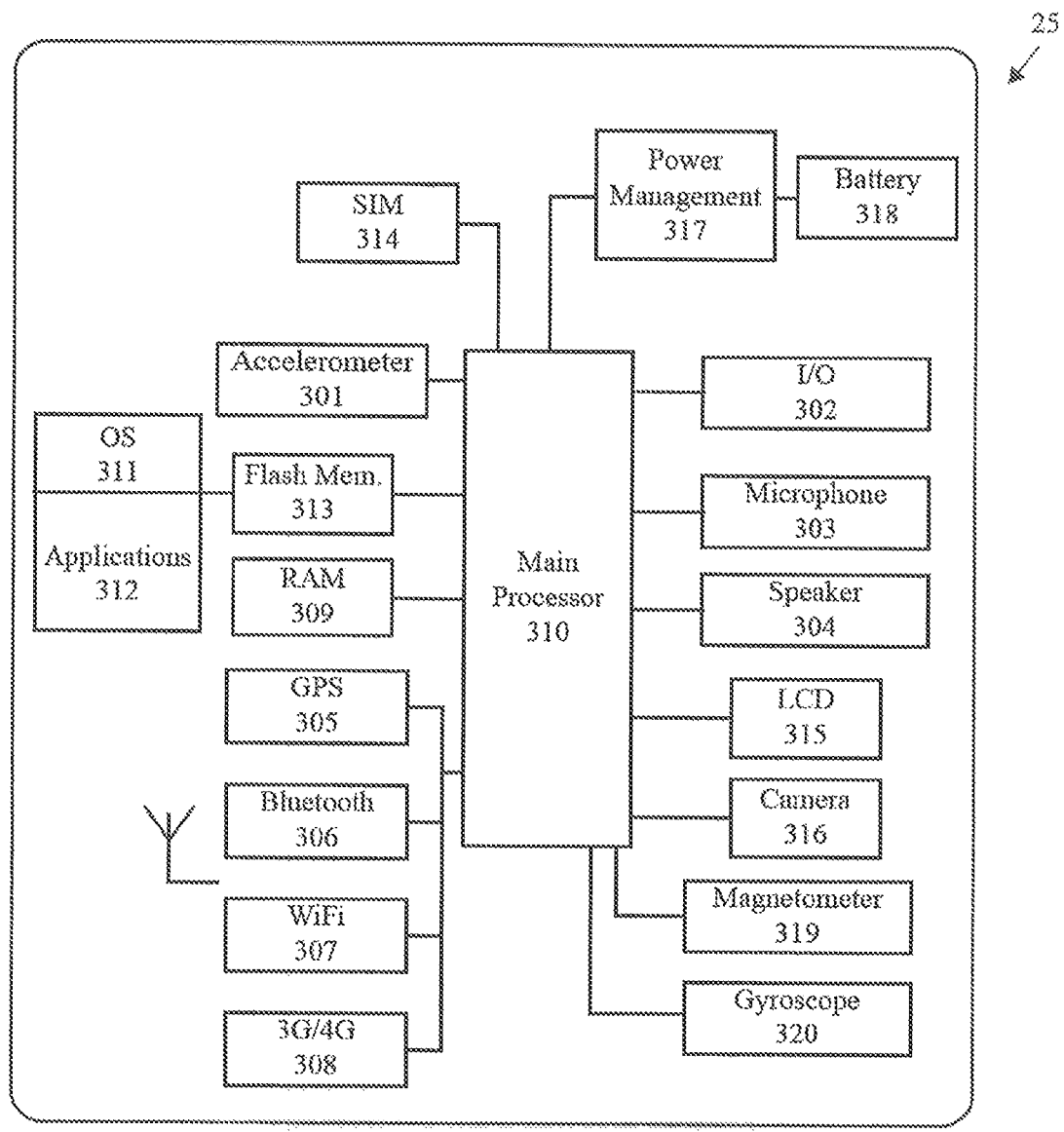
FIG. 20 is an isolated view of general electrical components of a mobile communication device.

As shown in FIG. 20, a typical mobile communication device 25 includes an accelerometer 301, I/O (input/output) 302, a microphone 303, a speaker 304, a GPS chipset 305, a Bluetooth component 306, a Wi-Fi component 307, a 3G/4G component 308, RAM memory 309, a main processor 310, an OS (operating system) 311, applications/software 312, a Flash memory 313, SIM card 314, LCD display 315, a camera 316, a power management circuit 317, a battery 318 or power source, a magnetometer 319, and a gyroscope 320.

Each of the interface descriptions preferably discloses use of at least one communication protocol to establish handshaking or bi-directional communications. These protocols preferably include but are not limited to XML, HTTP, TCP/IP, Serial, UDP, FTP, Web Services, WAP, SMTP, SMPP, DTS, Stored Procedures, Import/Export, Global Positioning Triangulation, IM, SMS, MMS, GPRS and Flash. The databases used with the system preferably include but are not limited to MSSQL, Access, MySQL, Progress, Oracle, DB2, Open Source DBs and others. Operating system used with the system preferably include Microsoft 2010, XP, Vista, 2000 Server, 2003 Server, 2008 Server, Windows Mobile, Linux, Android, Unix, I series, AS 400 and Apple OS.

The underlying protocol at a server, is preferably Internet Protocol Suite (Transfer Control Protocol/Internet Protocol ("TCP/IP")), and the transmission protocol to receive a file is preferably a file transfer protocol ("FTP"), Hypertext Transfer Protocol ("HTTP"), Secure Hypertext Transfer Protocol ("HTTPS") or other similar protocols. The transmission protocol ranges from SIP to MGCP to FTP and beyond. The protocol at the server is preferably HTTPS.

A mobile communication service provider (aka phone carrier) of the customer such as VERIZON, AT&T, SPRINT, T-MOBILE, and the like mobile communication service providers, provide the communication network 60 for communication to the mobile communication device of the end user.

Wireless standards include 802.11a, 802.11b, 802.11g, AX.25, 3G, CDPD, CDMA, GSM, GPRS, radio, microwave, laser, Bluetooth, 802.15, 802.16, and IrDA.

Figure 21:
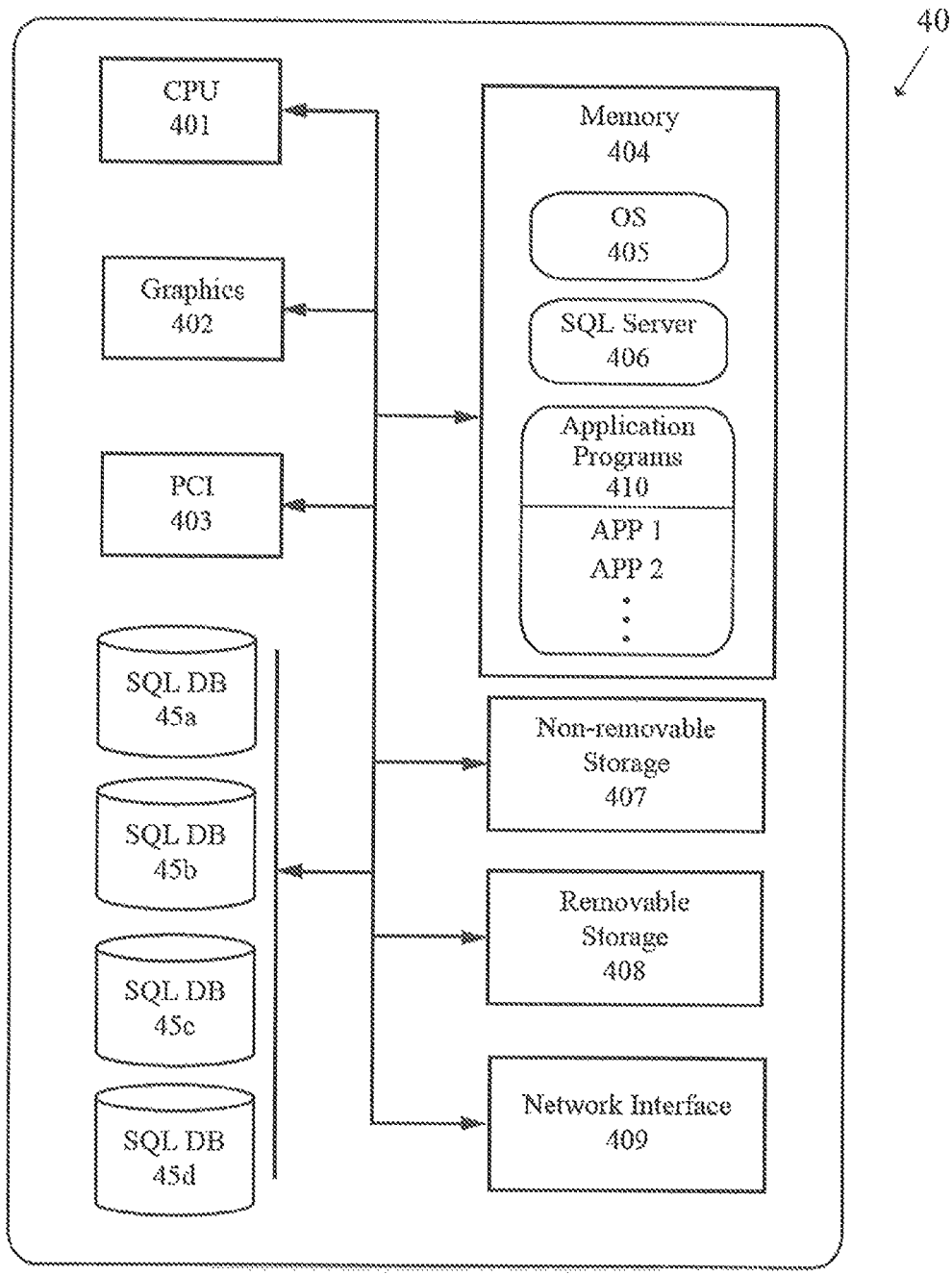
FIG. 21 is an isolated view of general electrical components of a server.

Components of a venue server 40 of the system 100, as shown in FIG. 21, includes a CPU component 401, a graphics component 402, PCI/PCI Express 403, memory 404, non-removable storage 407, removable storage 408, Network Interface 409, including one or more connections to a fixed network, and SQL database(s) 45a-45d, which includes the venue's CRM. Included in the memory 404, is an operating system 405, a SQL server 406 or other database engine, and computer programs/software 410. The venue server 40 also includes at least one computer program configured to receive data uploads and store the data uploads in the SQL database. Alternatively, the SQL server can be installed in a separate server from the venue server 40.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

I claim as my invention the following:

1. A method for single use of electronic retailer coupons and referral program, the method comprising:

transmitting a communication with a coupon offer from a marketing server to a mobile device of a customer over social media;

receiving a confirmation for acceptance of the coupon offer at the marketing server from the mobile device;

verifying at the marketing server that the coupon offer is still available for this customer;

transmitting a communication with a coupon link from the marketing server to the mobile device;

receiving a request for the coupon offer from the coupon link, the request having a HTTP header;

determining the type of mobile device based on the HTTP header in the request in order to publish the coupon offer in a format supported by the mobile device;

transmitting the coupon communication to the mobile device;

obtaining geolocation data for the mobile device at the marketing server;

verifying that the geolocation of the mobile device matches the geolocation of the retail location for the coupon;
verifying the coupon with a multi-factor authentication token at the retail location utilizing a time-sensitive keychain device that receives the multi-factor authentication token at the retail location to match the multi-factor authentication token for the coupon;
receiving redemption verification of the use of the coupon;
storing the redemption verification in a database;
downloading a referral feature on a mobile application of the mobile device;
transmitting a unique link via text with a mobile device of a referral;
clicking on the unique link;
entering a mobile number of the mobile device of the referral;
receiving a text to confirm joining a rewards program;
receiving an opt-in offer via text;
receiving a text at the mobile device of the user;
checking a status of referrals;
earning an achievement upon meeting a threshold of referrals; and
receiving a subsequent coupon for use;
wherein a receipt for the coupon transaction is uploaded to a platform running on a remote server, wherein the platform searches a database for a corresponding redemption for transactions at the store location and the coupon offer during the time window, wherein the platform associates the mobile number of the mobile device with the receipt;
wherein a notification is transmitted when a discount is given without a corresponding offer redemption in the database and when a redemption is received by a mobile phone but the corresponding discount is not found on the receipt.

2. The method according to claim 1 wherein the communication is one of a SMS, an email, a social network message, a mobile push, a television ad, or a radio ad.

3. The method according to claim 1 further comprising requesting the customer opt-in to a loyalty program.

4. The method according to claim 1 wherein the coupon is sent in a format supported by the mobile device.

5. The method according to claim 1 wherein redemption only works if the customer is at the geolocation for the retailer.

6. The method according to claim 1 wherein a multi-factor authentication engine prevents fraud.

7. The method according to claim 1 wherein the coupon is for ice cream.

8. The method according to claim 1 further comprising targeting future offers to the customer based on the coupon redemption history.

9. A system for single use of electronic retailer coupons and referral program, the system comprising:
a marketer server;
at least one retail location;
at least one mobile device of a customer;
a plurality of referral mobile devices; and
a network;
wherein the marketing server is configured to transmit a communication with coupon offer from the marketing server to the mobile device of the customer over social media;
wherein the marketing server is configured to receive a confirmation for acceptance of the coupon offer at the marketing server from the mobile device;
wherein the marketing server is configured to verify at the marketing server that the coupon offer is still available for this customer;
wherein the marketing server is configured to transmit a communication with a coupon link from the marketing server to the mobile device;
wherein the marketing server is configured to receive a request for the coupon offer from the coupon link, the request having a HTTP header, the marketing server configured to determine the type of mobile device based on the HTTP header in the request in order to publish the coupon offer in a format supported by the mobile device;
wherein the marketing server is configured to transmit the coupon communication to the mobile device;
wherein the marketing server is configured to obtain geolocation data for the mobile device at the marketing server;
wherein the marketing server is configured to verify that the geolocation of the mobile device matches the geolocation of the retail location for the coupon;
wherein the marketing server is configured to verify the coupon with a multi-factor authentication token at the retail location utilizing a time-sensitive keychain device that receives the multi-factor authentication token at the retail location to match the multi-factor authentication token for the coupon;
wherein the marketing server is configured to receive redemption verification of the use of the coupon;
wherein the marketing server is configured to store the redemption verification in a database;
wherein the marketing server is configured to transmit a referral feature to the mobile device;
wherein the marketing server is configured to transmit a unique link to each of the plurality of referral mobile devices;
wherein the marketing server is configured to transmit a confirmation text to each of the plurality of referral mobile devices;
wherein the marketing server is configured to transmit an opt-in offer via text to each of the plurality of referral mobile devices;
wherein the marketing server is configured to track a number of referrals for the user;
wherein the marketing server is configured to transmit to the mobile device of the user a subsequent coupon when an achievement is earned;
wherein a receipt for the coupon transaction is uploaded to a platform running on the marketing server, wherein the platform searches a database for a corresponding redemption for transactions at the store location and the coupon offer during the time window, wherein the platform associates the mobile number of the mobile device with the receipt;
wherein the system is configured to generate a notification if a discount is given without a corresponding offer redemption in the database and when a redemption is received by a mobile phone but the corresponding discount is not found on the receipt.

10. The system according to claim 9 wherein the marketing server is configured to target future offers to the customer based on the coupon redemption history.

11. The system according to claim 9 wherein the communication is one of a SMS, an email, a social network message, a mobile push, a television ad, or a radio ad.

12. The system according to claim 9 wherein the marketing server is configured to request the customer opt-in to a loyalty program.

13. The system according to claim 9 wherein the coupon is sent in a format supported by the mobile device.

14. The system according to claim 9 wherein redemption only works if the customer is at the geolocation for the retailer.

15. The system according to claim 9 wherein a multi-factor authentication engine prevents fraud.

16. The system according to claim 9 wherein the coupon is for ice cream.

17. A method for single use of electronic retailer coupons and referral program, the method consisting essentially of the steps of:
- a) transmitting a communication with a coupon offer from a marketing server to a mobile device of a customer over social media;
- b) receiving a confirmation for acceptance of the coupon offer at the marketing server from the mobile device;
- c) verifying at the marketing server that the coupon offer is still available for this customer;
- d) transmitting a communication with a coupon link from the marketing server to the mobile device;
- e) receiving a request for the coupon offer from the coupon link, the request having a HTTP header;
- f) determining the type of mobile device based on the HTTP header in the request in order to publish the coupon offer in a format supported by the mobile device;
- g) transmitting the coupon communication to the mobile device;
- h) obtaining geolocation data for the mobile device at the marketing server;
- i) verifying that the geolocation of the mobile device matches the geolocation of the retail location for the coupon;
- j) verifying the coupon with a multi-factor authentication token at the retail location utilizing a time-sensitive keychain device that receives the multi-factor authentication token at the retail location to match the multi-factor authentication token for the coupon;
- k) receiving redemption verification of the use of the coupon;
- l) storing the redemption verification in a database;
- m) downloading a referral feature on a mobile application of the mobile device;
- n) transmitting a unique link via text with a mobile device of a referral;
- o) clicking on the unique link;
- p) entering a mobile number of the mobile device of the referral;
- q) receiving a text to confirm joining a rewards program;
- r) receiving an opt-in offer via text;
- s) receiving a text at the mobile device of the user;
- t) checking a status of referrals;
- u) earning an achievement upon meeting a threshold of referrals; and
- v) receiving a subsequent coupon for use;

wherein steps a-v are performed in order;

wherein a receipt for the coupon transaction is uploaded to a platform running on a remote server, wherein the platform searches a database for a corresponding redemption for transactions at the store location and the coupon offer during the time window, wherein the platform associates the mobile number of the mobile device with the receipt; wherein a notification is transmitted when a discount is given without a corresponding offer redemption in the database and when a redemption is received by a mobile phone but the corresponding discount is not found on the receipt.

* * * * *